US006682765B1

(12) United States Patent
Kalnish et al.

(10) Patent No.: US 6,682,765 B1
(45) Date of Patent: Jan. 27, 2004

(54) METHOD FOR PRODUCING CEREAL BREAD

(75) Inventors: Grigory Izeslavovich Kalnish, Molodezchniy bul. 1-174, Tver (RU), 170000; Vladimir Mikhailovich Antonov, Krasnoyarsk (RU)

(73) Assignee: Grigory Izeslavovich Kalnish, Tver (RU)

( * ) Notice: Subject to any disclaimer, the term of this patent is extended or adjusted under 35 U.S.C. 154(b) by 0 days.

(21) Appl. No.: 09/622,699

(22) PCT Filed: Mar. 5, 1999

(86) PCT No.: PCT/RU99/00064

§ 371 (c)(1),
(2), (4) Date: Aug. 21, 2000

(87) PCT Pub. No.: WO00/38529

PCT Pub. Date: Jul. 6, 2000

(30) Foreign Application Priority Data

Dec. 25, 1998 (RU) ............................................. 98123076

(51) Int. Cl.⁷ ................................................. A21D 8/00
(52) U.S. Cl. ........................... 426/549; 426/19; 426/62; 426/496; 426/506; 426/507
(58) Field of Search .................................. 426/549, 506, 426/507, 496, 19, 62

(56) References Cited

U.S. PATENT DOCUMENTS

| | | | | | |
|---|---|---|---|---|---|
| 4,861,601 | A | * | 8/1989 | Seneau .......................... | 426/19 |
| 5,130,158 | A | * | 7/1992 | Otsubo et al. ............... | 426/622 |
| 5,738,892 | A | * | 4/1998 | Takaoka ....................... | 426/242 |
| 6,022,479 | A | * | 2/2000 | Smirnov ....................... | 426/237 |
| 6,120,808 | A | * | 9/2000 | Jodlbauer .................... | 426/19 |

FOREIGN PATENT DOCUMENTS

| | | | |
|---|---|---|---|
| RU | 2108718 C1 | * | 4/1998 |
| SU | 1214054 A | | 2/1986 |
| SU | 1837778 A | | 8/1993 |
| SU | 1837779 A | | 8/1993 |

OTHER PUBLICATIONS

Baking Science and Technology, 1973, pp. 644–646.*

* cited by examiner

*Primary Examiner*—Lien Tran
(74) *Attorney, Agent, or Firm*—Frishauf, Holtz, Goodman & Chick, P.C.

(57) ABSTRACT

According to this method, the seeds previously cleaned and still having their germs are steeped in an aqueous medium (water or activated water with or without nutriments) in an amount of at least 0.6 liter per 1 kg of seeds until the acidity of the aqueous medium reaches 2 to 12 degrees and until the swelling rate of the seeds is characterized by their capacity, under compression, to flatten while loosing the undamaged germ. The aqueous medium where the seeds are steeped is drained and the seeds are ground in order to remove the liquid fraction which is not related to the humid seed mass thus obtained. The dough is kneaded until the target consistency is reached while adding the ingredients indicated in the recipe. The dough is then cut, allowed to rest for 15 to 50 minutes at 35–99° C. while maintaining humidity balance conditions in the dough-atmosphere system, and eventually baked is undertaken at 200 to 300° C., provided that during the first 15 to 200 seconds the dough is in a steam-saturated medium. The seeds can further be additionally washed before their grinding while the liquid fraction removed during the grinding process is used as an ingredient for the dough.

18 Claims, No Drawings

METHOD FOR PRODUCING CEREAL BREAD

The present invention relates to the food industry and may be used for production of bread and other bakery product from grain.

BACKGROUND OF THE INVENTION

There is a known method of bread production, which involves steeping the previously cleaned seeds in water under the temperature of 8–40 centigrade in the duration of 5 to 24 hours, grinding the previously cleaned seeds to obtain the seed paste, kneading the dough by the seed paste with prescribed by the recipe ingredients, separating the seed dough into forms, allowing to rest and baking (Author Certificate USSR Number 1214054, MPK A 21 D 13/02, 1986—analogue).

There is a known method of bread production, which involves steeping the previously cleaned seeds in water, grinding of the seeds, kneading the dough by mixing the seed paste with water and yeast, cutting of seed dough into forms, allowing to rest and baking. The process of the seed dough mixing up is undertaken via mechanical impact on the seed paste with the frequency of 2 to 15 G in the period of time required for the seed paste maturation; the seeds are steeped in the period of time of 6 to 24 hours, yeast is used in the quantity of 2.1 to 5.0 per cent of the grain weight (Patent USSR Number 1837778, MPK A21 D 13/02, 1993—analogue).

The most similar by the technical characteristics method of production to the described one is the method of the bread production which involves steeping the previously cleaned seeds having their germ in water, grinding the seeds until seed paste with consistency of no more than 500 mkm is reached; kneading the dough by mixing up the seed paste with water and yeast, cutting into forms, allowing to rest and baking. The yeast used for the seed dough is the processed non-activated yeast in the amount of 2.1–5.0% of the seed dough weight; and water is used in the amount as to ensure the seed dough humidity of 48–52 percent (Patent USSR Number 1837779, MPK A 21 D 13/02, 1993—prototype).

All the above captured methods of the bread production result in cereal bread being of low shape and insufficient density, with increased acidity level, and therefore with low organoleptic characteristics.

SUMMARY OF THE INVENTION

An object of our invention is developing a industrial method for producing the cereal bread with complex high technical result what is combining the good organoleptic characteristics (shape, taste and scent, appearance of the crunch, colour, and the elasticity of the bread texture) with the increased biological value of the end product.

According to the invention, a method for producing cereal bread comprising the steps of a steeping the previously cleaned seeds having their germs; a grinding the previously cleaned seed having their germ to make seeds paste; the dough is kneaded until the target consistency is reached mixing up the making seed paste with the adding ingredient indicated in the recipe, cut, allowed to rest and eventually baked.

The method further includes the steps of:

the previously cleaned seeds having their germ are steeped in an aqueous medium in an amount of at least 0.6 liter per 1 kg of seeds until the acidity of the aqueous medium reaches 2 to 12 degrees and until swelling rate of the seeds is characterized by their capacity, under compression, to flatten while loosing the undamaged germ; and aqueous medium where the seeds are steeped is drained; and the seeds are ground in order to remove the liquid fraction which is not related to the humid seed paste thus obtained; and the allowing to cut dough to rest for 15 to 30 minutes at 35–99° C. while maintaining humidity balance conditions in the dough-atmosphere system; and eventually baking is undertaken at 200 to 300° C., provided that during the first 15 to 200 seconds the dough is in a steam-saturated medium.

In the process of the seeds steeping in an aqueous medium is used water, as well as active water with nutriments or without them. After the aqueous medium has been drained the seeds can be additionally rinsed before grinding. For the higher biological value of the bread some of the removed and stored liquid fraction from the grinding process can be used as an ingredient in seed dough kneading.

DETAILED DESCRIPTION

For the purposes of implementation of the herein-described method of the cereal bread production both wheat and rye can be used. The herein described method is implemented in the following consequence: The seeds are cleaned from all the alien substances and mineral dust, peeled using the traditional method of the outer layer seed peeling and consequent mechanical impact (either using brushing or peeling machine of the type MO-500), and then rinsed again. It is important that the chosen method of the seed peeling ensures that the seed germ is preserved, and also prevents formation of crackles in the seed. The previously cleaned seeds having their germ are steeped in aqueous medium in an amount of at last 0.6 liters per 1 kg of seeds. In an aqueous medium is used pure or active water. Using the active water is beneficial, as it insures the better quality of the seed dough, and therefore increases the cereal bread porosity. To increase biological value of the seeds, various nutriments (e.g. biological food value addition, salt, etc.) can be added to the aqueous medium. The steeping is undertaken under the temperature of 25 to 45 centigrade in the duration of time until the acidity of the aqueous medium reaches 2 to 12 degrees and until swelling rate of the seeds is characterized by their capacity, under compression, to flatten while loosing the undamaged germ. Under the above conditions the first stage of the seed germ growing/germination/starts. During this stage the gluten, which forms part of the seed germ, is neutralised. That eliminates its negative impact on the seed dough (i.e. it makes it watery and dim), and the final product less elastic and less porous. Secondly the ability of the germ to be released easily guarantees that it will not be damaged in grinding; that leads to the balance of the amino acids and proteins in the bread, and also concentration of vitamins B group, E, PP and other minerals, including calcium. The aqueous medium is drained. That removes the acids, which have negative impact on the taste and the scent of the cereal bread, but also on its porosity. That affect can be reinforced by additional rinsing. For that purposes the swollen seeds are put on the sieve and are rinsed by a stream of clean water. The swollen seeds are ground. The liquid fraction evolved is removed. That is implemented by using the dispergator type D150. The seed paste consists of the seed layers and the undamaged seed germ. The removal of the liquid fraction ensures even share of the seed germs among the seed paste, which has a positive impact on the bread porosity and in high organoleptic characteristics combined with good biological value. The removed liquid fraction is to be collected in clean jars and to be used as an ingredient in the seed dough mixing up process, as it is rich in organic. The seed dough in mixed up, using kneading equipment type A2-XTM. The consistency of the ready seed dough depends on the type of seeds used (e.g. wheat, rye, or the mixture of the above). Ingredients (yeast, food value additions) prescribed by the recipe are added. In the mixing of the seed dough pure water can be used, as well as liquid fraction removed during the grinding process. The seed dough should be elastic and should pulsate and restore the original shape when de-formed. Adding the liquid fraction removed from the grinding process has an additional technological benefit. The protein from the germ, dissolved in the water, ensures better structural connection and stickiness in the process of seed dough mixing. That in turn ensures high level of porosity—a prerequisite for high organoleptic characteristics. The seed dough is cut on the trays and allowed to rest. The resting process is undertaken in the duration of 15 to 50 minutes under the temperature of 35 to 99 centigrade and the humidity balance conditions in the dough-atmosphere system, for example using baking equipment type G4PE, equipped with the air humidifier. The humidity balance condition in the dough-atmosphere system results in constant humidity level within the cereal bread. The end of the resting process is judged subjectively based on visual characteristics (e.g. shape) of the seed dough. However, on batch automated lines—judging on time which is defined by experimentation, depending on type and quality of the raw seeds. The resting process under maintained humidity balance conditions in the dough-atmosphere system is vital for achieving high quality of the final product. The humidity balance conditions prevent seed dough from being covered in dry scab. The dry scab has a negative impact in the baking stage as it limits the evaporation of the water from the seed dough, and therefore decreases the porosity and elasticity of the final cereal bread product. Baking is undertaken under the temperature of 200 to 320 centigrade in the bakery ovens, type KAP-400, which are equipped with water sprayers The first 15 to 200 seconds the process is undertaken in a steam-saturated medium. Specific progammes for the baking are set subject to the product weight and dough forms, as well as type and quality of the seeds.

The importance of the steam-saturated environment is two-fold. On one hand it fosters three parallel processes of—'post fermenting stage of tie dough', 'correcting errors of forming', and finally 'intensive heating of the dough'. On the other hand it leads to the appearing of the shiny crunch—a specific criteria of the otganoleptic characteristics of the cereal bread according to the herein-described invention.

EXAMPLE 1

In this example the Kazakh wheat was used. This type of wheat is characterised by high elasticity and the level of gluten of 25 percent (the index of internal deformation of gluten equals to 35 percent). The seeds are cleaned from all the foreign substances and mineral dust. Thoroughly cleaned and rinsed seeds having their germ are steeped in aqueous medium in proportion of 0.9 liters of water to 1 kg of the grain. The start up temperature of the water was 25 centigrade, and the air temperature was 15 centigrade. The steeping was undertaken until the acidity level of the water reached 3 degrees and swelling rate of the seeds which was characterized by their capacity, under compression, to flatten while loosing the undamaged germ. The aqueous medium was drained by means of filtering on a sieve. The steeped seeds were rinsed using the water with the temperature of 15 centigrade. The moisture seeds were ground using the equipment type D150 until a moisture seed paste was reached. The liquid fraction, which evaporated during the grinding process, was removed and stored. As the result of the grinding process thin seed paste was made, which consisted of preserved seed germ, part of the outer layer of the grain, as well as range of amino acids, vitamins, natural sugar, etc. In order to mix up the seed dough the following components were added to the seed paste: the removed and stored liquid fraction from the grinding process, yeast (in proportion of 40 g per 1 kg of seeds) and salt (in proportion of 16 g per 1 kg of seeds). The seed dough was kneaded using the equipment type A2-XTM until homogeneous seed dough was reached. In order to bake the final product with the weight of 250 grams the seed dough was cut in baking forms (305 grams each) and was allowed to rest. The fermenting process was undertaken in the duration of 50 minutes under the temperature of 35 centigrade and humidity balance condition in the dough-atmosphere system. The equipment used for fermenting was of type G4PRA.

The baking of the bread was undertaken in the baking oven type KAP-400 under the temperature of 310 centigrade while the first 60 seconds were in a steam-saturated medium. The process was controlled visually, until the appearance of the dark brown, uneven shiny crust. The ready baked cereal bread was of high volume, light brown, with crusty sides of the relatively thin size. On the dimension of the sides there were evenly placed the brown spots—the traces of the germs. The texture of the bread was elastic, with specific brown spots of the germs. The porosity of the bread —73%.

EXAMPLE 2

The process was undertaken in Example 1. However, a different sort of the wheat was used, which consisted of both Kazakh (65%—gluten level of 35 percent) and ordinary wheat (from Tula and Lipeck regions—35%) with level of gluten of 21–22 percent. The aqueous medium used for steeping was active water in proportion of 0.7 liters per 1 kg of seed. The start up temperature of the active water was 30 centigrade and the air temperature was 25 centigrade. The steeping was undertaken until the acidity level of the aqueous medium reached 7.5 degrees and swelling rate of the seeds was characterized by their capacity, under compression, to flatten while loosing the undamaged germ.

In order to bake product with the weight of 400 grams the seed dough was cut in forms (470 grams each) and was allowed to rest.

The fermenting was undertaken in the duration of 15 minutes under the temperature of 90 centigrade while maintaining the humidity balance in the dough-atmosphere system. The baking of the bread was undertaken under the temperature of 210 centigrade, in the first 100 seconds the dough was in the steam-saturated medium. The process was controlled visually, until the appearance of the dark brown, uneven, shiny crust. The cereal bread was of volume, light brown, with crusty sides of the relatively thin size. On the dimension of the sides there were evenly placed the brown spots—the traces of the germs. The texture was elastic, with specific brown spots of the germs. The porosity of the bread—67%

EXAMPLE 3

The process was undertaken as in Example 2 but for the following:

The aqueous medium used for the steeping of the seeds was pure water in proportion of 0.6 liters per 1 kg of the seeds with the start up temperature of 45 centigrade. The process was continued until the acidity level of 9 degrees and swelling rate of the seeds was characterized by their capacity, under compression, to flatten while loosing the undamaged germ. For the final product with the weight of 800 grams the seed dough was cut in the forms (890 grams each). The fermenting process was undertaken in the duration of 25 minutes under the temperature of 60 centigrade. The baking process was undertaken under temperature of 280 centigrade. In the first 180 seconds the dough was in a steam-saturated medium. The cereal bread was of high volume, light brown, with crusty sides of the relatively thin size. On the dimension of the sides there were evenly placed the brown spots—the traces of the germs. The texture was elastic, with specific brown spots of the germs. The porosity of the bread—74%.

PRACTICAL IMPLEMENTATION

The herein captured invention can be used for practical implementation in the industry for the production of the cereal bread with increased organoleptic characteristics. The herein captured method of production despite of having no specifically designed fermenting process procedures still ensures good porosity of the final grain bread. The final bread has an elastic texture, with a shiny crust; it is of light brown to dark brown colour.

What is claimed is:

1. A method for producing cereal bread comprising the steps of steeping cleaned seeds having their germs in an aqueous medium containing at least 0.6 liter of aqueous medium per kg of seeds, until the swelling of the seeds is characterized by their capacity, under compression, to flatten while releasing undamaged germ;

separating the seeds from the aqueous medium; thereafter grinding the seeds to form a seed paste and removing any liquid fraction;

mixing the seed paste with additional ingredients including yeast, to form a bread dough;

kneading the bread dough;

allowing the dough to rest for 15 to 30 minutes at 35 to 99° C. while maintaining humidity balance conditions in the dough atmosphere system;

baking the dough at 200° to 320° C. under conditions wherein during the first 15 to 200 seconds the baking is done in a steam-saturated atmosphere, thereby to form the bread.

2. The method according to claim 1, wherein said aqueous medium is water or activated water with nutriments or without nutriments.

3. The method according to claim 1, wherein before grinding, the seeds are additionally washed after draining the aqueous medium where the seeds are steeped.

4. The method according to claim 1, wherein the liquid fraction removed during the grinding process is used as an ingredient for the dough.

5. The method according to claim 2, wherein before grinding the seeds are additionally washed after draining the aqueous medium where the seeds are steeped.

6. The method according to claim 2, wherein the liquid fraction removed during the grinding process is used as an ingredient for the dough.

7. The method according to claim 3, wherein the liquid fraction removed during the grinding process is used as an ingredient for the dough.

8. The method according to claim 5, wherein the liquid fraction removed during the grinding process is used as an ingredient for the dough.

9. The method according to claim 1, wherein said aqueous medium is water.

10. The method according to claim 3, wherein said aqueous medium is water.

11. The method according to claim 7, wherein said aqueous medium is water.

12. The method according to claim 1, wherein said aqueous medium is water with nutriments.

13. The method according to claim 3, wherein said aqueous medium is water with nutriments.

14. The method according to claim 7, wherein said aqueous medium is water with nutriments.

15. The method according to claim 1, wherein said aqueous medium is activated water.

16. The method according to claim 3, wherein said aqueous medium is activated water.

17. The method according to claim 7, wherein said aqueous medium is activated water.

18. The method of claim 1, wherein the steeping of cleaned seeds is at a temperature of 25° C. to 45° C.

* * * * *